United States Patent [19]

Lilienthal, III et al.

[11] Patent Number: 5,405,566

[45] Date of Patent: Apr. 11, 1995

[54] METHOD FOR FIXTURING MODULES

[75] Inventors: Peter F. Lilienthal, III, Princeton, N.J.; Ivan Pawlenko, Holland, Pa.; Ching-Ping Wong, Lawrenceville, N.J.

[73] Assignee: AT&T Corp., Murray Hill, N.J.

[21] Appl. No.: 135,645

[22] Filed: Oct. 14, 1993

[51] Int. Cl.⁶ .................... B29C 39/10; B29L 31/34
[52] U.S. Cl. .................... 264/267; 264/268; 264/297.7; 264/313; 425/DIG. 44; 439/936
[58] Field of Search ............ 264/40.5, 268, 267, 264/297.6, 297.7, 236, 347, 313, 334; 425/DIG. 44; 439/936

[56] References Cited

U.S. PATENT DOCUMENTS

| | | | |
|---|---|---|---|
| 2,668,987 | 2/1954 | Harris et al. | 264/313 |
| 2,817,875 | 12/1957 | Harris et al. | 264/313 |
| 2,835,924 | 5/1958 | Schmeling | 264/313 |
| 3,755,615 | 8/1973 | Paullus et al. | 439/936 |
| 4,083,902 | 4/1978 | Clyde | 264/267 |
| 4,148,856 | 4/1979 | Gress et al. | 264/297.6 |
| 4,264,549 | 4/1981 | Utner | 264/313 |
| 4,314,960 | 2/1982 | Hass | 264/313 |
| 4,654,963 | 4/1987 | Sugalski | 264/268 |
| 4,664,461 | 5/1987 | Schubert et al. | 439/936 |
| 5,106,289 | 4/1992 | Pikulski | 425/DIG. 44 |

Primary Examiner—Mathieu D. Vargot
Attorney, Agent, or Firm—Robert B. Levy

[57] ABSTRACT

A module, such as a terminal block (10), configured of a body (12) having an open end (20) and at least one window (24) spaced from the open end, is fixtured and sealed by way of a channel (28) comprised of a pair of parallel, spaced-apart, generally elastic walls (30,32) jointed by a bottom member (34). The walls (30,32) and the bottom member (34) run longitudinally a distance at least as long as the width of the terminal block (10) to allow the block to be received between, and to be held by, the walls. At least one protrusion extends out from a separate one of the walls (30,32) and the base member (34) for receipt in the window (24) in the terminal block to seal the same.

4 Claims, 1 Drawing Sheet

METHOD FOR FIXTURING MODULES

TECHNICAL FIELD

This invention relates to a technique for simultaneously fixturing and sealing a module having at least one window therein to enable the module to be filled with gel and thereafter cured.

BACKGROUND OF THE INVENTION

Notwithstanding the widespread use of non-metallic cable (i.e., optical fiber) in various telecommunications applications, copper wire is still the media of choice for connecting customer premises to a local termination point, either a local telephone central office, or a subscriber loop carrier terminal. A connection between a two-pair copper wire from the customer premises and the local terminal point is invariably accomplished by a terminal block carried by a mounting board. Each terminal block is generally configured of an insulative body having an open end for overlying a pair of contacts extending out from the mounting block. The terminal block body also has a pair of openings (e.g., windows) spaced from the open end to allow a pair of wires, originating from the customer premise, to enter the body for connection to a separate one of the mounting block contacts when the terminal block is secured to the mounting board.

As described in our co-pending U.S. patent application Ser. No. 08/102,178, for "Method for Curing Polymers", filed on Aug. 4, 1993 (herein incorporated by reference), an advantage is obtained by filling the terminal block body with a silicone resin gel. The silicone resin gel serves to encapsulate the mounting block contacts while advantageously permitting a separate one of the pair of wires to be connected to each contact. In this way, the contacts are isolated from external elements such as moisture and environmental erosion.

Presently, manufacture of the above-described terminal block is carried out by first temporarily sealing each of the windows in the terminal block body by way of a rubber seal held in place by a spring-biased clamp. With the windows in the terminal block body temporarily sealed, the body of the terminal block is then filled with gel through its open end. Thereafter, the gel is cured by heating the terminal block in an oven. After the gel is cured and the rubber seals are removed, the terminal block is mounted to the mounting block by inverting the terminal block body so that its open end overlies the mounting block contacts.

The above-described process for filling and curing the terminal block is subject to several difficulties. First, the spring fixture for holding the rubber seals against the windows in the terminal block body is awkward to operate. Moreover, the gel often adheres to the rubber seals sealing the windows in the terminal block body. As a result, the rubber seals become damaged, necessitating their replacement on a frequent basis. The need to frequently replace the rubber seals drives up the cost of terminal block manufacture.

Thus there is a need for an improved method of fixturing and simultaneously sealing such terminal blocks.

SUMMARY OF THE INVENTION

Briefly, in accordance with a preferred embodiment of the invention, there is disclosed a method for fixturing and sealing a module, such as a terminal block, configured of a prismatic body having an open end and at least one opening through the body spaced from the open end. The fixturing and sealing method of the invention is practiced by providing a channel, comprised of a pair of parallel, spaced-apart, longitudinally-running, generally elastic walls connected to each other at their base by a bottom member which has a longitudinally running hinge therein to allow the walls to be flexed away from each other. The module is placed in the channel for fixturing purposes by flexing at least one of the walls from the other to allow the terminal block to be seated therebetween such that a sealing protrusion, extending from a separate one of the channel walls and/or base member enters and thereby seals each window in the module. A pressure is applied to each of the walls, typically by means of one or more pressure rollers, while a linear motion is imparted to the channel to displace the module between a first station at which gel is admitted into the open end of the module body, and a second station at which the gel is cured.

FIG. 1 is an isometric view of an apparatus in accordance with the invention for fixturing and sealing a terminal block.

DETAILED DESCRIPTION

Figure 1:
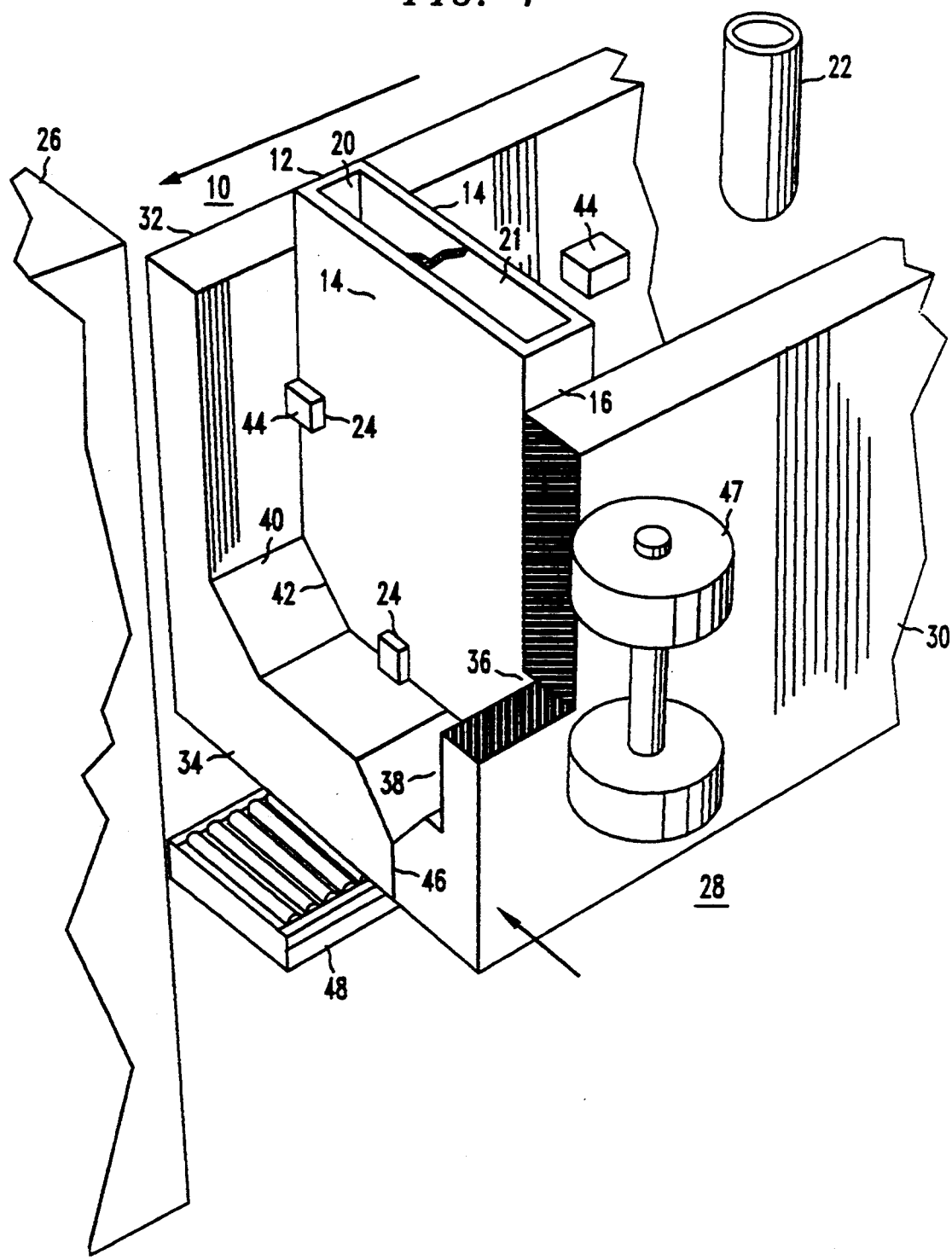

FIG. 1 illustrates a terminal block 10 of the type described in our co-pending U.S. patent application, Ser. No. 08/102,728, herein incorporated by reference. The terminal block 10 is configured of a prismatic body 12 fabricated from an insulative, generally impervious material such as polycarbonate. The terminal block body 12 has two pairs of opposed sides 14—14 and 16—16 as well as a closed bottom 18. The terminal block body 12 has an open top 20 to allow a silicone resin gel 21 to be admitted into the body at a gel filling station 22.

In addition to its open top 20, the terminal block body 12 also has at least one, and preferably, a plurality of openings or windows 24—24 in one or more of its sides 16—16 and/or bottom 18. As described in our co-pending application Ser. No. 08/102,178, the windows 24—24 in the terminal block body 12 enable one or more wires (not shown) to be inserted into the terminal block for engagement by one or more contacts (not shown).

The existence of the windows 24—24 in the terminal block body 12 makes filling the body with the gel 21 difficult. Typically, the gel 21 admitted into the body at the gel filling station 22 has a relatively low viscosity. Thus, unless the windows 24—24 are sealed, the gel 21 will leak out, especially through the window(s) in the bottom 18 of the terminal block body 12 prior to curing the gel by placing the terminal block 10 in an oven 26.

In the past, the windows 24—24 were sealed, prior to filling the terminal block body 12 with the gel 21, by placing a rubber seal (not shown) against each window. Each rubber seal was held in place with a spring clip (not shown). As mentioned previously, the spring clips of the prior art were awkward to manipulate. The aforementioned disadvantage is overcome by the fixture of the invention that takes the form of an elongated channel 28, sized to receive and hold at least the terminal block 10 and preferably a plurality of such blocks, while sealing the windows 24—24 in each such block. The channel 28 of the invention comprises a unitary structure having a pair of spaced-apart, generally parallel, longitudinally running walls 30 and 32, each integral with, and rising upward from, a bottom member 34 which runs the length of the walls. Typically, the channel 28 is fabricated from an elastomeric material, such as a sulphur-vulcanized or phosphite-vulcanized rubber or the like.

In practice, the geometry of the channel 28, and particularly, the spacing between the walls 30 and 32, as well as the topology of the opposing wall faces and that of the top surface of the bottom member 34, is selected so that each terminal block body 12 (only one being shown) can be conformally received in the channel between the channel walls as indicated in FIG. 1. For example, in the preferred embodiment, the terminal block body 12 has a projection 34 extending from its right-hand wall 16 as seen in FIG. 1. Thus, to accommodate the projection 36 on the terminal block body 12, the inside face of the wall 30 (i.e., the face opposing the wall 32) has a horizontal slot 38 running along the wall. Similarly, the bottom member 34 has a tapered shoulder 40, running longitudinally therealong at the juncture of the bottom member and the wall 32, to seat a downwardly tapered portion 42 at the base 18 of the terminal block body 12.

In addition to having a topology that matches that of the terminal block body 12, at least one of the opposing faces of the walls 30 and 32 and/or the top surface of the bottom member 34 is advantageously provided with at least one, and preferably, a plurality of outwardly extending projections 44—44. In the embodiment illustrated in FIG. 1, the wall 32 and the top surface of the bottom member 18 of the channel 28 are each provided with a plurality of outwardly extending projections 44—44 at spaced intervals along the length of the wall and base member, respectively. The projections 44—44 are situated such that a separate one of them will be opposite a separate one of the windows 24—24 in the side and bottom, respectively, of the terminal block body 12, when the body is received in the channel.

Each of the projections 44—44 is of a size and shape to be received in, and thereby seal, a corresponding one of the windows 24—24. Like the rest of the channel 28, each of the projections 44—44 is made from a sulphur-vulcanized or phosphite-vulcanized rubber or a similar type of elastomeric material which contains substances which have the property of poisoning that portion of the gel 21 exposed through the window 24. In this way, the gel 21 adjacent to each window 24 does not cure, and therefore won't adhere to the corresponding projection 44 received in that window. In practice, the projections 44—44 are integral with the wall 32 and bottom member 18. However, it should be understood that the projections could also be made replaceable.

As indicated, the channel 28 is fabricated from an elastomeric material, typically rubber or the like, thereby allowing the walls 30 and 32 to enjoy a certain degree of flexure so that each wall may be flexed a slight amount from the other. For example, the wall 30 can be flexed slightly from the wall 32, as indicated by the dashed lines in FIG. 1. To increase the degree of flexure of the walls 30 and 32, the bottom member 34 is provided with a longitudinally running groove 46 which is cut deep enough to effectively create a hinge 46 that allows the wall 30, and a portion of the bottom member 34, to be pivoted to and from the wall 32.

While the walls 30 and 32 may be flexed apart as discussed to facilitate loading and unloading of a terminal block 10, once the terminal block is loaded, it should remain tightly in place. To this end, at least one, and preferably, a plurality of pressure rollers 47 (only one shown) are situated along the path of travel of the channel 28 so as to bear against the outside of each of the walls 30 and 32. In this way, the walls 30 and 32 are urged towards each other to bear against the terminal block 10 situated between the walls, thus keeping the terminal block firmly within the channel.

In practice, the channel 28 is at least as long as the width of one terminal block 10, and is usually longer. Advantageously, the channel 28 length may be larger than that of several terminal blocks 10 to allow a plurality of blocks to be held in the channel. A moving track 48, driven by a motor or the like (not shown), is provided for displacing the channel 28 between a point upstream of the gel filling station 21 and a point downstream of the oven 26. (Rather than employ a moving track 48, another type of suitable prime mover could be employed to displace the channel 28.)

While the channel 28 (or some portion thereof) is upstream of the gel filling station 22, the wall 30 (or at least a portion thereof) is displaced slightly (i.e., flexed) from the wall 32, and one or more terminal blocks 10 are then seated in the channel such that each window 24 in each terminal block body 12 is sealed by a corresponding one of the projections 44—44. (Each of the previously described pressure rollers 47 is typically situated so as to bear against the channel 28 downstream of where each terminal block 10 is loaded to allow for flexure of the walls 30 and 32.) Once each terminal block 10 has been loaded, the channel 28 is displaced by the track 48 to bring each just-loaded terminal block to the gel filling station 22 for filling with the gel 21. Thereafter, the channel 28 is displaced to bring the now-filled terminal block(s) 10 to the oven 26 for heating to cure the gel 21 in each block. Once the gel 21 is cured, the channel 28 is displaced to a location at which each block may be unloaded.

Advantageously, the channel 28 can be made endless, in which case, the channel would travel in a loop, thereby permitting the loading, filling, curing, and unloading of terminal blocks 10 on a continual basis. New, unfilled terminal blocks 10 would be successively loaded into the channel 28 at a point upstream of the gel filling station while blocks which had been filled and now cured are unloaded downstream of the oven 26. In this way, a large volume of terminal blocks 10 can be fabricated more economically.

The foregoing describes a fixture, in the form of channel 28, and its method of use, for fixturing a module, in the form of a terminal block 10, while simultaneously sealing a set of openings in the block, to facilitate manufacture thereof. It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for fixturing and sealing a module configured of a multi-sided body having an open end and at least one window through the body spaced from the open end;
   providing a channel, configured of a pair of parallel, spaced-apart, longitudinally-running, generally elastic walls, connected to each other by a bottom member such that at least one of the walls is effectively hinged to the bottom member;
   placing the module in the channel by temporarily separating one of the channel walls from the other so that a separate one of the sides of the module contacts a separate one of the channel walls while a sealing protrusion, extending from the channel, enters and thereby seals the window in the module;

applying pressure to each of the walls to maintain the module therebetween; while imparting a linear motion to the channel to displace the module between a first station at which gel is admitted into the module, and a second station at which the gel is cured.

2. The method according to claim 1 wherein the channel is of a width at least as long as that of the combined width of several modules and wherein said several modules are loaded into the channel in succession.

3. The method according to claim 1 wherein each sealing protrusion poisons a portion of the gel at the point where the protrusion enters the window in the module to prevent the gel from adhering to the protrusion.

4. The method according to claim 1 wherein pressure is applied to each wall by positioning a rotatable pressure roller thereagainst.

* * * * *